US010670139B2

United States Patent
Venter et al.

(10) Patent No.: US 10,670,139 B2
(45) Date of Patent: Jun. 2, 2020

(54) PLANETARY GEAR DEVICE FOR A TURBOMACHINE

(71) Applicant: Rolls-Royce Deutschland Ltd & Co KG, Blankenfelde-Mahlow (DE)

(72) Inventors: Gideon Venter, Berlin (DE); Jan Schwarze, Berlin (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 71 days.

(21) Appl. No.: 16/112,017

(22) Filed: Aug. 24, 2018

(65) Prior Publication Data

US 2019/0085973 A1   Mar. 21, 2019

(30) Foreign Application Priority Data

Sep. 15, 2017 (DE) .................. 10 2017 008 675

(51) Int. Cl.
*F02C 7/36* (2006.01)
*F16H 57/08* (2006.01)
(Continued)

(52) U.S. Cl.
CPC ............ *F16H 57/082* (2013.01); *F02C 7/36* (2013.01); *F16H 1/28* (2013.01);
(Continued)

(58) Field of Classification Search
CPC ......... F16H 57/082; F16H 2057/02021; F16H 2057/0221; F02C 7/36; F05D 2260/40311
(Continued)

(56) References Cited

U.S. PATENT DOCUMENTS 4,271,928 A    6/1981  Northern
4,674,360 A *  6/1987  Matoba ............. F16H 57/02004
                                                      475/331
(Continued)

FOREIGN PATENT DOCUMENTS

DE    2925964 A1   1/1980
DE    3706212 A1   10/1987
(Continued)

OTHER PUBLICATIONS

European Search Report dated Nov. 6, 2018 for counterpart European Application No. 18191301.3.
(Continued)

*Primary Examiner* — Roger L Pang
(74) *Attorney, Agent, or Firm* — Shuttleworth & Ingersoll, PLC; Timothy J. Klima

(57) ABSTRACT

A planetary gear device for a turbomachine includes a planetary carrier and planetary wheel arranged in an axial direction between two planetary carrier areas connected to a support appliance, with the planetary wheel rotatably mounted on the support appliance. On outer sides facing away from the planetary wheel, the planetary carrier areas include cone surfaces that enclose connection areas with the support appliance, with diameters decreasing with increasing axial distance from the planetary wheel. Cone surfaces of a tensioning appliance radially enclose and are respectively adjusted thereto and act together such that a force that respectively results from an axial tensioning force of the tensioning appliance applied on the cone surfaces of the planetary carrier areas is applied at the connection areas between the support appliance and the planetary carrier areas. The tensioning appliance cone surfaces operatively connect via a coupling element.

10 Claims, 3 Drawing Sheets

Figure 1:
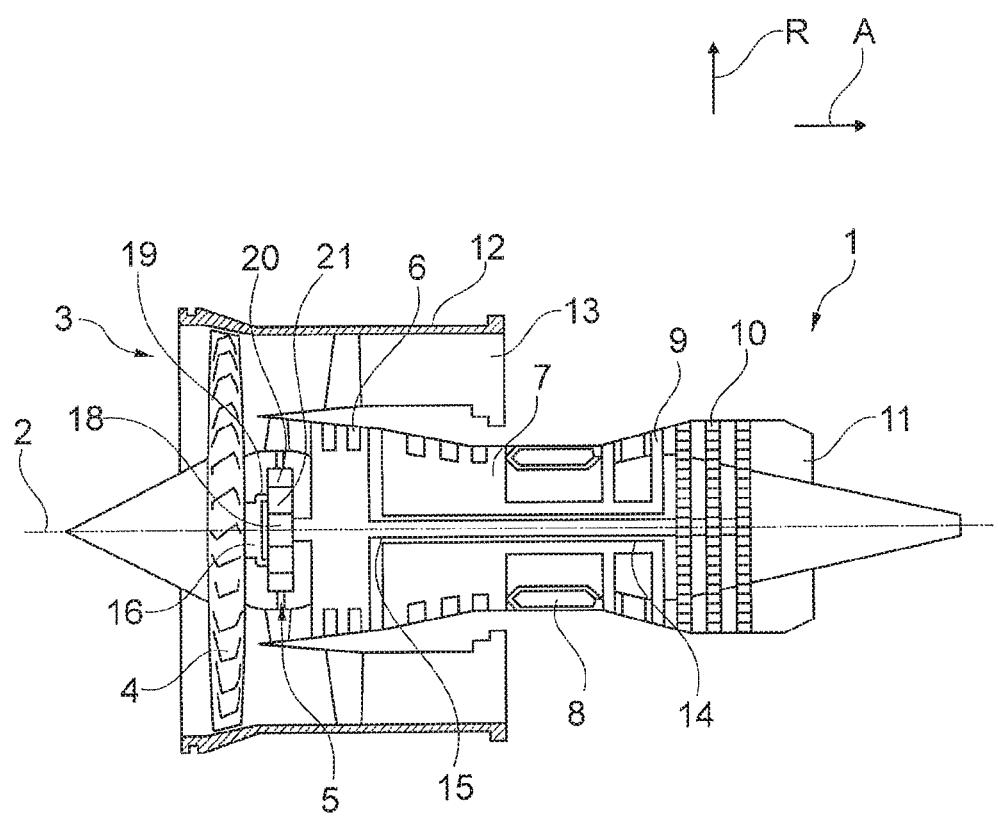

(51) Int. Cl.
*F16H 1/28* (2006.01)
*F16H 57/02* (2012.01)
*F16H 57/022* (2012.01)

(52) U.S. Cl.
CPC .............. *F05D 2260/40311* (2013.01); *F16H 2057/0221* (2013.01); *F16H 2057/02021* (2013.01); *F16H 2057/085* (2013.01)

(58) Field of Classification Search
USPC ....................................................... 475/331
See application file for complete search history.

(56) References Cited

U.S. PATENT DOCUMENTS

| | | | |
|---|---|---|---|
| 5,391,125 | A | 2/1995 | Tura et al. |
| 6,223,616 | B1 | 5/2001 | Sheridan |
| 2006/0112531 | A1* | 6/2006 | Skrabs ................ F16H 57/0482 29/428 |
| 2010/0077881 | A1* | 4/2010 | Hicks .................... F16H 1/2836 74/411 |
| 2013/0102432 | A1 | 4/2013 | Imai et al. |
| 2015/0167819 | A1 | 6/2015 | Imai et al. |
| 2017/0108113 | A1 | 4/2017 | Hasting et al. |
| 2017/0167540 | A1 | 6/2017 | Hasting |
| 2018/0100573 | A1* | 4/2018 | Madge ................. F16H 1/2836 |

FOREIGN PATENT DOCUMENTS

| | | |
|---|---|---|
| EP | 2559913 A1 | 2/2013 |
| EP | 3159578 A1 | 4/2017 |
| FR | 1005218 A | 4/1952 |
| GB | 1617033.4 | 10/2016 |

OTHER PUBLICATIONS

German Search Report dated Jun. 13, 2018 for counterpart German Patent Application No. DE 10 2017 008 675.3.

* cited by examiner

PLANETARY GEAR DEVICE FOR A TURBOMACHINE

This application claims priority to German Patent Application DE102017008675.3 filed Sep. 15, 2017, the entirety of which is incorporated by reference herein.

The invention relates to a planetary gear device for a turbomachine according to the kind as disclosed herein.

What is known from practice are jet engines in which a fan is connected to a low-pressure turbine by means of a planetary gear. The planetary gear is embodied with a stationary hollow wheel and a rotating planetary carrier, with the planetary carrier being embodied in multiple parts. In the axial direction of the jet engine, the planetary wheels are arranged in a rotatable manner between two planetary carrier areas on support appliances connected thereto. The support appliances respectively comprise bolts that are operatively connected to the planetary carrier areas in a torque-proof manner via press fits. Provided between the planetary wheels and the bolts are sliding or roller bearings via which the rotational decoupling is realized.

The press fits are usually embodied in a cost-effective manner as expansion connections and/or as shrink connections. Here, it is known to join the expansion connections by sub-cooling the inner part, and to join shrink connections by heating the outer part. With large over-dimensions, both methods are combined.

During operation of the jet engine, strong centrifugal forces act at the planetary wheels of the planetary gear due to the high rotational speeds of the planetary carrier. Depending on the respectively chosen embodiment of the planetary gear, not only centrifugal forces but also the loads of the torque to be respectively transferred during operation are introduced. The respectively resulting forces are introduced into the planetary carrier areas via the press fits.

However, here there is the problem that the retaining forces that result from the press fits provided between the bolt and the planetary carrier areas are overcome when an admissible load limit is exceeded, and undesired relative movements between the bolts and the planetary carrier areas occur. Resulting from such relative movements is undesired wear in the area of the bolts and the planetary carrier areas, which in a long run have a negative effect on the functions of the planetary gear, and thus shorten the service life of the planetary gear.

What is known from the unpublished GB 1617033.4 of the applicant is a solution through which such relative movements in the area between the bearing bolts of the planetary wheels and the planetary carrier, which are shortening the service life of a planetary gear, are to be prevented. For this purpose, it is suggested to provide respectively at least one wedge in the connection areas between the bolts and the planetary carrier areas to obtain maximally high retaining forces of the press fits between the bolts and the planetary carrier areas.

The wedges are inserted between the bolts and the planetary carrier areas by using liquid nitrogen and injection of oil under high pressure, which, however, entails a high mounting effort. Via the wedges, pre-stress is created in the bolts in the planetary carrier areas surrounding the bolts so as to respectively provide the retaining forces that counteract the relative rotational movements of the bolts with respect to the planetary carrier areas.

The loads that act during operation at the planetary wheels are partially overlaid with the applied pre-stresses. This overlays in turn favor a detachment of the press fits between the bolts and the planetary carrier areas, as they cause a reduction of the retaining forces that act in the area of the press fits.

To be able to reliably prevent detachment of the press fits during operation, the rigidity of the planetary carrier areas is to de designed to be correspondingly large, which, however, disadvantageously increases the weight of the planetary gear.

The present invention is thus based on the objective to provide a planetary gear device for a turbomachine that is characterized by a low structural component weight and a long service life, and that is also easy to mount.

This objective is achieved through a planetary gear device with features as disclosed herein.

The planetary gear device according to the invention for a turbomachine comprises at least one planetary carrier and at least one planetary wheel arranged thereon in a rotatable manner. The planetary wheel is arranged in the axial direction between two planetary carrier areas with which a support appliance is connected in a torque-proof manner. The planetary wheel is mounted in a rotatable manner on the support appliance.

According to the invention, on their outer sides that are facing away from the planetary wheel, the planetary carrier areas are embodied with respectively one cone surface enclosing a connection area with the support appliance. The diameters of the cone surfaces decrease with increasing axial distance from the planetary wheel. The cone surfaces of the planetary carrier areas respectively act together with cone surfaces of a tensioning appliance adjusted thereto and radially enclosing the cone surfaces of the planetary carrier areas. Here, the cone surfaces of the planetary carrier areas and the cone surfaces of the tensioning appliance act together in such a manner that a force that respectively results from the axial tensioning force of the tensioning appliance applied on the cone surfaces of the planetary carrier areas via the coupling element of the tensioning appliance and presses the connection areas inward in the radial direction is applied at the connection areas between the support appliances and the planetary carrier areas. For this purpose, the cone surfaces of the tensioning appliance are in operative connection with each other via the coupling element.

In a planetary gear device embodied according to the invention, a force acting in the axial direction of the support appliance is introduced by means of the tensioning appliance, which is substantially based on the functioning principle of a tie rod, into the group of planetary carrier areas, support appliance and tensioning appliance. The interaction of the planetary carrier areas and the tensioning appliance in the area of the cone surfaces, i.e. the respective outer cones of the planetary carrier areas and the respective inner cones of the tensioning appliance result in pre-stressing forces that act radially inward on the group of planetary carrier areas and support appliance.

This pre-stress generating force results in a contact pressure in the area of the connection that is preferably embodied as a press fit between the planetary carrier areas and the support appliance. This created pre-stress is directed counter to the forces created during operation. It has the advantage that relative rotational movements between the support appliance and the planetary carrier appliances occur during operation only if loads acting on the group of support appliance and planetary carrier areas, which may for example be embodied in a plate-shaped manner, and resulting from the centrifugal forces are greater than those in known planetary gear devices if the involved structural components are respectively designed with the same rigidity.

If the planetary gear device according to the invention is designed with structural component rigidities at which the relative rotational movements between the support appliance and the planetary carrier areas occur in the event of the same load levels as in conventional planetary gear devices, the planetary gear device according to the invention is advantageously characterized by a lower structural component weight than a known planetary gear device.

Further, advantageously there is also the possibility of carrying out press fits between the support appliance and the planetary carrier areas with smaller overdimensions. In this way, loads acting in the area of the press fit are low, so that mounting of the structural components can be performed with small production tolerances and without a high risk of damage.

In an advantageous embodiment of the planetary gear device according to the invention, the cone surfaces of the planetary carrier areas and the cone surfaces of the tensioning appliance respectively enclose an angle with the rotational axis of the planetary carrier of between 0.5° to 30°. In particular if the angle is between 1° and 10°, a desirably large force, which during operation is directed counter to the centrifugal force, can be obtained in a constructionally simple manner through an interaction of the tensioning appliance with the planetary carrier areas.

In a further embodiment of the planetary gear device according to the invention, which is easy to manufacture and can be mounted with small effort, the tensioning appliance is embodied with a disc element and with a tensioning element. Here, the tensioning element can be screwed onto the coupling element for creating the tensioning force that acts in the axial direction of the tensioning appliance. Further, the disc element is embodied with one of the cone surfaces of the tensioning appliance and in the mounted state of the tensioning appliance is arranged between the tensioning element and the planetary carrier area on the side of one of the planetary carrier areas that is facing away from the planetary wheel.

In one embodiment of the planetary gear device according to the invention that is particularly easy to mount, the disc element and the tensioning element are formed in one piece.

For avoiding relative movements between the co-acting cone surfaces of the tensioning appliance and the cone surfaces of the planetary carrier areas during mounting, the tensioning element and the disc element are embodied as separate structural components in a constructionally simple embodiment of the planetary gear device according to the invention.

In an embodiment of the planetary gear device according to the invention, which is also easy to mount, the coupling element is formed in one piece with the tensioning element of the tensioning appliance. Here, one of the cone surfaces of the tensioning appliance is provided in the area of the tensioning element which is embodied in one piece with the coupling element. The tensioning element is arranged on the side of the planetary carrier area that is facing away from the planetary wheel, with the cone surface of the planetary carrier area being operatively connected with the cone surface of the disc element.

In a further embodiment of the planetary gear device according to the invention, the support appliance respectively has end stop surfaces. The support appliance with the planetary carrier areas acts together with the end stop surfaces in the area of the sides of the planetary carrier areas that are facing the planetary wheel. Through the end stop surfaces, a distance in the axial direction between the planetary carrier areas is defined in an constructionally simple manner.

Here, the preferably bolt-like or sleeve-like support appliance can have a spacer element, which may for example be embodied as a socket, for setting a distance that is present in the axial direction between the encasing appliances. Further, the support appliance can be embodied in one piece with the spacer element. It can also be provided that the support appliance has a support element that acts together with the planetary carrier areas, and a separately embodied spacer element. In the spacer element, an inner ring of a bearing appliance of the planetary wheels can be integrated, for example.

To be able to e.g. ensure a hydraulic fluid supply of the bearing appliance of the planetary wheel in a simple manner, the tensioning appliance can have a hydraulic fluid supply channel through which hydraulic fluid can be conveyed in the direction of the bearing appliance, which may for example be embodied as a slide bearing or roller bearing.

If the support appliance is embodied with at least one recess that extends substantially in the radial direction of the planetary wheel, the bearing appliance can in particular be easily supplied with hydraulic fluid that is conveyed through the clamp-in appliance.

Further, the invention relates to a jet engine with a planetary gear device according to the invention.

The features specified in the patent claims as well as the features specified in the following exemplary embodiments of the planetary gear device according to the invention are suitable to further develop the subject matter according to the invention respectively on their own or in any desired combination with each other.

Further advantages and advantageous embodiments of the subject matter according to the invention follow from the patent claims and from the exemplary embodiments that are described in principle in the following by referring to the drawing, wherein, with a view to clarity, the same reference signs are used in the description of the exemplary embodiments for structural components having the same structure and functionality.

Figure 2:
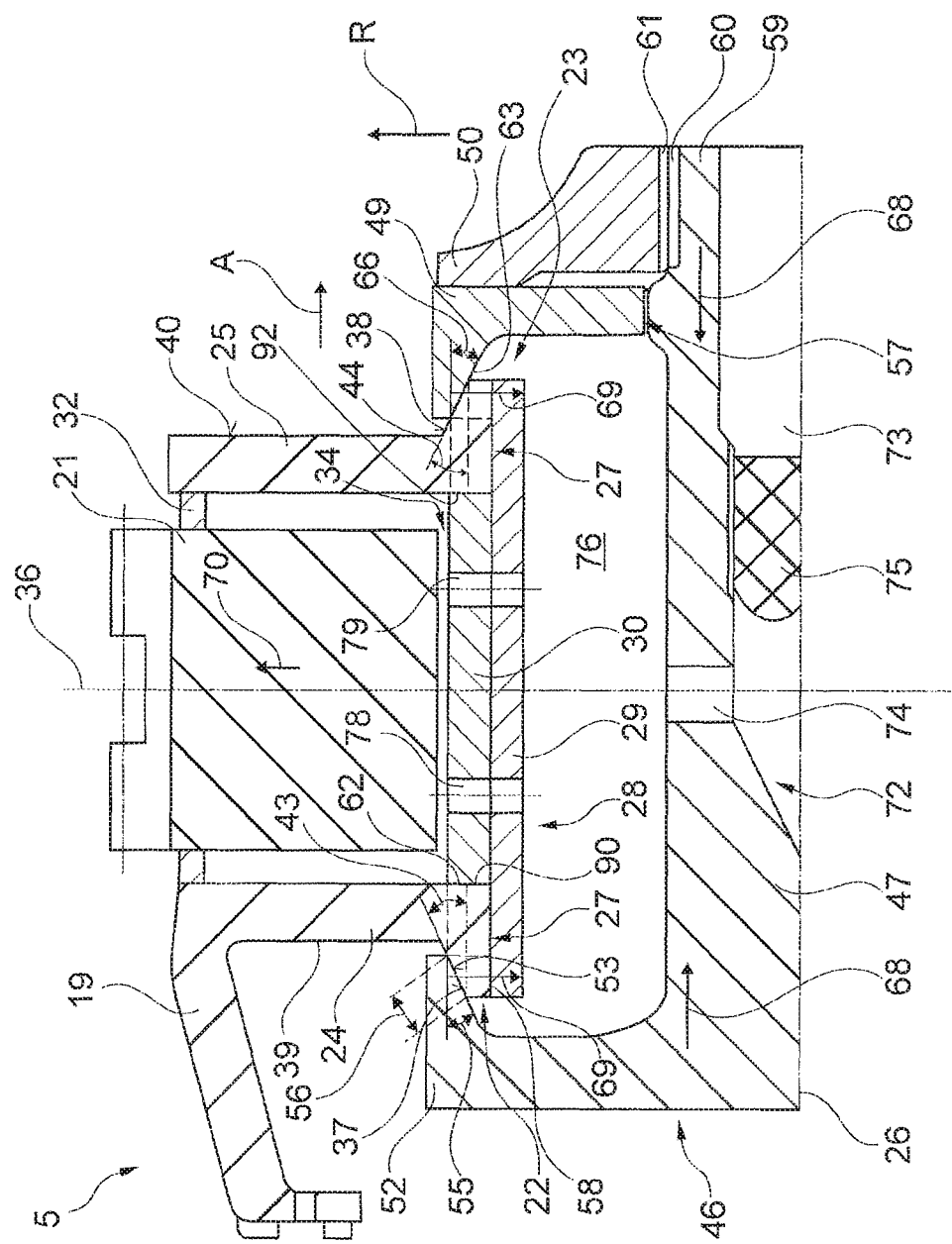
Figure 3:
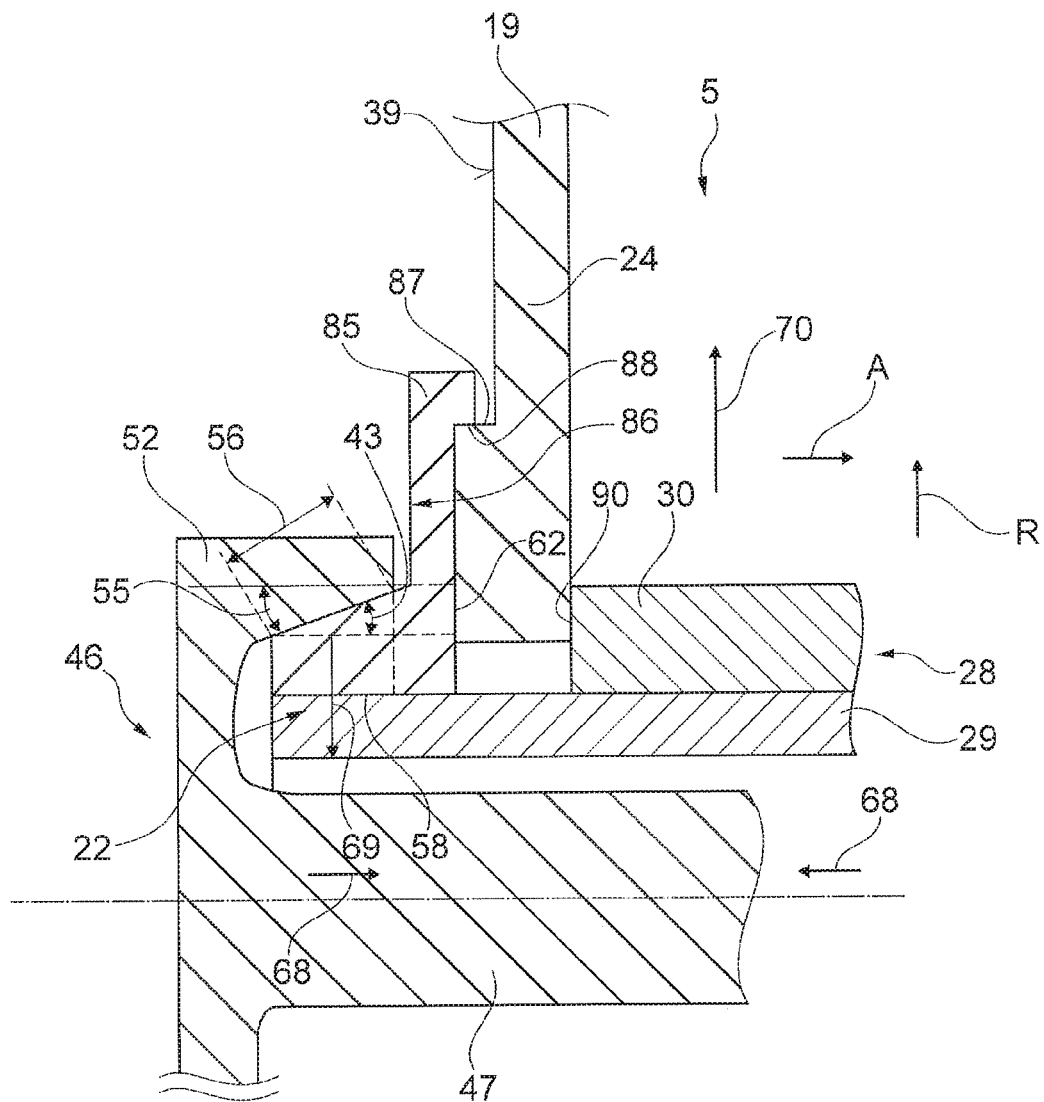

Herein:

FIG. 1 shows a simplified sectional view of a jet engine, wherein a fan is operatively connected to a low-pressure turbine via a planetary gear device;

FIG. 2 shows a strongly simplified partial sectional view of an area of the planetary gear device according to FIG. 1, wherein, in the shown area, the planetary gear device has a planetary wheel, a planetary carrier comprising two planetary carrier areas, as well as a tensioning appliance acting together with the planetary carrier areas; and FIG. 3 shows a rendering of a further embodiment of the planetary gear device.

FIG. 1 shows a turbomachine that is embodied as a jet engine 1 of an aircraft having a planetary gear device 5 that will be described in more detail in the following. The jet engine 1 is a turbomachine that can be advantageously combined with the planetary gear device 5. As will become clear from the following description, the planetary gear device 5 can also be used with differently embodied turbomachines.

The jet engine 1 has a main rotational axis 2. Further, the jet engine 1 comprises in the axial flow direction A an air intake 3, a fan 4, a planetary gear device 5, a low-pressure compressor 6, a high-pressure compressor 7, a combustion appliance 8, a high-pressure turbine 9, a low-pressure turbine 10 and a discharge nozzle 11. An engine nacelle 12 surrounds the jet engine 1 and delimits the air intake 3.

The jet engine 1 operates in a conventional manner, wherein air entering the intake 3 is accelerated by the fan 4 to create two air flows. A first air flow flows into the intermediate-pressure compressor 6 and a second air flow is passed through a subsidiary flow channel 13 or bypass channel to provide a drive thrust. The low-pressure compressor 6 compresses the air flow that is supplied to it, before the air is further compressed in the area of the high-pressure compressor 7.

The compressed air that is discharged from the high-pressure compressor 7 is introduced into the combustion appliance 8, where an intermixing with fuel occurs, and the fuel-air mixture is combusted. The resulting hot combustion products expand and in doing so drive the high-pressure turbine 9 and the low-pressure turbine 10, before they are discharged via the discharge nozzle 11 to provide additional drive thrust. The high-pressure turbine 9 and the low-pressure turbine 10 drive the high-pressure compressor 7 or the low-pressure compressor 6 by means of a high-pressure shaft 14 or a low-pressure shaft 15. The low-pressure shaft 15 that couples the low-pressure turbine 10 with the low-pressure compressor 6 is coupled to the fan 4 via the planetary gear device 5 which represents a reduction gear wherein a drive torque that is applied to the planetary gear device 5 via the low-pressure shaft 15 is increased corresponding to the stationary gear ratio of the planetary gear device 5, and is supplied to a fan shaft 16. If the fan 4 is driven by the low-pressure turbine 10, the rotational speed of the low-pressure shaft 15 is reduced corresponding to the gear ratio of the planetary gear device 5, and the fan shaft 16 as well as the fan 4 are driven with this reduced rotational speed and with a torque that is increased with respect to the torque applied to the low-pressure shaft 15.

In the shown embodiment of the planetary gear device 5, a sun wheel 18 of the planetary gear device 5 is connected in a torque-proof manner with the low-pressure shaft 15, and a planetary carrier 19 of the planetary gear device 5 is connected in a torque-proof manner with the fan shaft 16. A hollow wheel 20 of the planetary gear device 5 is attached in a manner fixed tot he housing. What is thus present is a planetary gear device 5 that is embodied as an epicyclic planetary gear, in which strong centrifugal forces act on the planetary wheels 21 of the planetary gear device 5 during operation of the jet engine 1.

FIG. 2 shows an area of the planetary gear device 5 in which an attachment of a planetary wheel 21 to the planetary carrier 19, which in the present case is embodied in one piece, is present. The planetary carrier 19 has two planetary carrier areas 24, 25 that are embodied with plate-shaped areas and that are respectively connected via a press fit 27 to a support appliance 28 that is embodied as a sleeve or bolt in an inner area with respect to a central axis 26 of the planetary wheel 21. In the present case, the support appliance 28 has a support element 29 that is connected via a press fit 27 with the planetary carrier areas 24, 25 and a spacer element 30 that is embodied with end stop surfaces 90, 91 at which the planetary carrier areas 24, 25 abut. With respect to the central axis 26, the spacer element 30 is arranged in the radial direction R outside the support element 29, in particular adjoining the same. A distance in the axial direction A of the jet engine 1 between the planetary carrier areas 24, 25 is defined by means of the spacer element 30. In an alternative embodiment, the support element 29 and the spacer element 30 can be embodied integrally or in one piece with each other.

Alternatively, there is also the possibility of embodying the planetary carrier with multiple parts.

In the present case, the planetary wheel 21 is mounted at the spacer element 30 that is embodied as a socket by means of a bearing appliance 34 embodied as a slide bearing. Here, the planetary wheel 21 is arranged in the axial direction between the planetary carrier areas 24 and 25.

The first planetary carrier area 24 as well as the second planetary carrier area 25 have respectively one cone surface 37 or 38 that encloses a connection area 22, 23 with the support appliance 28 in the circumferential direction in the area of outer sides 39, 40 that are facing away from the longitudinal central plane 36 of the planetary wheel 21. The cone surfaces 37 and 38 of the planetary carrier areas 24 and 25 are respectively embodied as an outer cone and extend beyond the outer sides 39 and 40 of the planetary carrier areas 24 and 25. Here, the diameter of the cone surfaces 37 and 38 respectively steadily decreases in the axial direction A outwards, starting at the outer sides 39 and 40. At that, the cone surfaces 37 and 38 respectively enclose an angle 43 or 44, which preferably lies respectively between 1° and 10°, with respect to the axial direction A or a rotational axis of the planetary wheel 21.

Further provided is a tensioning appliance 46 that is embodied as a tie rod appliance having a coupling element 47. The coupling element 47 additionally acts together with a disc element 49 and a tensioning element 50 on the outer side 40 of the planetary carrier area 25 that is facing away from the planetary wheel 21. In a first axial end area, the bolt-like coupling element 47 is embodied in one piece with an anchor-shaped tensioning element 52 that is embodied with a cone surface 53 that is adjusted to the cone surface 37 of the planetary carrier area 24. The cone surface 53 is embodied as an inner cone and in the mounted state of the tensioning appliance 46 acts together with the outer cone or the cone surface 37 of the first planetary carrier area 24 from radially outside in the radial direction R.

In the mounted operational state, the inner diameter of the cone surface 53 steadily decreases in the direction of an area that is facing away from the outer side 39, starting from an area that is facing towards the outer surface 39 of the planetary carrier area 24. Further, the cone surface 53 encloses an angle 55 with the axial direction A that is identical to the angle 43 between the cone surface 37 and the axial direction A.

A projection of a surface 56 in the radial direction R, which corresponds to an overlapping area or an abutment area between the cone surface 37 of the planetary carrier area 24 and the cone surface 53, is provided at least as an abutment surface 58 between the planetary carrier area 24 and the support appliance 29. In this way, a sufficiently high retaining force can be created between the planetary carrier area 24 and the support appliance 29, by means of which a relative rotational movement between the support appliance 29 and the planetary carrier area 24 can be prevented in a reliable manner. In addition, at least the projection of the surface 56 in the axial direction A is also provided as an abutment surface 62 in the axial direction between the planetary carrier area 24 and the support appliance 24, or at its spacer element 30.

The disc element 49 has an inner bore 57, so that the disc element 49 can be guided over an end area 59 of the coupling element 47. The tensioning element 50 that is embodied as a nut is embodied with an inner thread 61 that is provided for interacting with an outer thread 60 that is provided at the end area 59 of the coupling element 47.

Further, the disc element 49 is embodied with a cone surface 63 that is formed as an inner cone and that in the mounted operational state of the planetary gear device 5 acts together with the cone surface 38 of the planetary carrier area 25. Here, the diameter of the cone surface 63 steadily decreases in the direction of an area of the cone surface 63 that is facing away from the outer surface 40, starting from an area that is facing towards the outer surface 40 of the planetary carrier area 25. At that, the cone surface 63 of the disc element 49 encloses an angle 66 equal to the angle 44 with the axial direction A of the planetary gear device 5.

During mounting of the planetary gear device 5, the coupling element 47 is first guided, with its end that comprises the outer thread 60, in the axial direction A through the planetary carrier area 24 and the support appliance 29 until the outer thread 60 protrudes from the planetary carrier area 25 and the cone surfaces 37 and 53 abut each other. Subsequently, the disc element 49 is guided across the end area 59 of the coupling element 47 and finally increasingly pressed against the cone surface 38 of the planetary carrier area 25 with its cone surface 63 via the tensioning element 50 by screwing the tensioning element 50 onto the coupling element 47, while at the same time the cone surface 53 of the coupling element 47 is being pressed to the cone surface 38 of the planetary carrier area 24. Corresponding of the provided tightening torque of the tensioning element 50, a tensile force acting in the direction of the arrow 68 is applied to the group. This axial tensile force results in a radially inwardly directed compressive force, with its direction of action being indicated by arrow 69 in FIG. 2.

The compressive force results from the operative connections in the area between the cone surfaces 37 and 38 the planetary carrier areas 24 and 25 and the cone surfaces 53 and 61 of the tensioning appliance 46. The compressive force counteracts a centrifugal force that is applied during operation to the planetary wheel 21 in the direction of the arrow 70. The retaining forces that respectively result from the compressive force from the tensioning appliance 46 and the press fit 27 between the support appliance 29 and the planetary carrier areas 24 and 25 are overcome by the centrifugal force only when the loads are introduced in the area of the planetary carrier areas 24 and 25, equalizing and exceeding the pre-stress that is generated through the tensioning appliance 46 in the area of the planetary carrier areas 24 and 25, and then facilitate or allow a relative rotational movement between the support appliance 29 and the planetary carrier areas 24 and 25.

Further, FIG. 2 shows simplified components of a hydraulic circuit 72 provided for supplying the slide bearings 34 with hydraulic fluid. Here, the coupling element 47 has a hydraulic fluid supply channel 73 that, starting from the second end area 59, extends in the axial direction A in the direction of the longitudinal central plane 36. In the present case, a hydraulic fluid filter 75 is arranged therein. Connecting to the hydraulic fluid supply channel 73 is a further hydraulic fluid supply channel 74 that is arranged in the radial direction R in the area of the longitudinal central plane 36. Via the hydraulic fluid supply channels 73, 74, a space 76 that is delimited by the tensioning appliance 46 and the retaining appliance 28 can be supplied with hydraulic fluid, wherein the space 76 is particularly well sealed against the environment thanks to the interaction of the encasing appliances 24, 25 with the clamp-in appliance 46. Through the recesses 78, 79, in the present case two, that extend in the radial direction R through the retaining appliance 28, hydraulic fluid that is present in the space 76 can be supplied to the slide bearing 34.

FIG. 3 shows a further embodiment of the planetary gear device 5, in which the tensioning appliance 46 is embodied with an anchor-shaped tensioning element 52 in the area that acts together with the planetary carrier area 24. Since the planetary gear device 5 according to FIG. 3 generally has the structure as it has been described in connection with FIG. 2, only the differences between the planetary gear devices 5 according to FIG. 2 and FIG. 3 are explained in more detail in the following description. Thus, as far as the further structure and further functionalities of the planetary gear device 5 according to FIG. 3 are concerned, it is referred to the above description regarding FIG. 2.

The cone surface 37 of the planetary carrier area 24 is provided in the area of a disc element 85 that abuts the outer side 39 of the planetary carrier area 24. Here, in the area of its outer side 39, the planetary carrier area 24 is formed with an annular collar 86 at which the disc element 85 abuts at the planetary carrier area 24, and thus has a greater axial width in this area. Thus, the outer side 39 is embodied with an abutment surface 87 extending in the circumferential direction of the planetary carrier area 24, with the disc element 85 abutting thereat with an abutment surface 88 that also extends in the circumferential direction of the disc element 85, and with the disc element 85 being centered thereat in the radial direction at the planetary carrier area 24.

In the mounted state of the planetary gear device 5, the disc element 85 is pressed by the tensioning appliance 46 in the axial direction A as well as in the radial direction R against the planetary carrier area 24. Via the disc element 85, the tensioning appliance 46 additionally creates the press fit with the support appliance 28 which creates the retaining forces that are necessary for preventing the rotational movements of the support appliance 28 with respect to the planetary carrier area 14, or in the present case with respect to the disc element 85, which shorten the service life of the planetary gear device 5.

Depending on the respectively present application case, there is also the alternative or additional possibility of providing the cone surface 38 of the planetary carrier area 25 in the area of an additional disc element, as in the planetary carrier area 24 according to FIG. 3 and to the extent as described with respect to FIG. 3.

PARTS LIST 1 turbomachine; jet engine
2 rotational axis
3 air intake
4 fan
5 planetary gear device
6 low-pressure compressor
7 high-pressure compressor
8 combustion appliance
9 high-pressure turbine
10 low-pressure turbine
11 discharge nozzle
12 engine nacelle
13 bypass channel
14 high-pressure shaft
15 low-pressure shaft
16 fan shaft
17 sun wheel
18 planetary carrier
19 hollow wheel
21 planetary wheel
22, 23 connection area
24 planetary carrier area 25 planetary carrier area
26 central axis of the planetary wheel
27 press fit
28 support appliance
29 support element
30 spacer element; socket
34 bearing appliance; slide bearing
36 longitudinal central plane of the planetary wheel
37 cone surface of the planetary carrier area 24
38 cone surface of the planetary carrier area 25
39 outer side of the planetary carrier area 24
40 outer side of the planetary carrier area 25
43, 44 angle
46 tensioning appliance
47 coupling element
49 disc element
50 tensioning element; nut
52 anchor-shaped tensioning element
53 cone surface of the tensioning element 52
55 angle
56 surface
57 inner bore of the disc element
58 abutment surface
59 end area of the coupling element
60 outer thread of the clamp-in element
61 inner thread of the tensioning element
62 abutment surface
63 cone surface of the disc element 49
66 angle
68, 69, 70 arrow
72 hydraulic circuit
73 hydraulic fluid supply channel
74 further hydraulic fluid supply channel
75 hydraulic fluid filter
76 space
78, 79 recesses
85 disc element
86 annular collar
87, 88 abutment surface
90, 91 end stop surface of the support appliance 28
A axial direction of the turbomachine
R radial direction of the planetary wheel

The invention claimed is:

1. A planetary gear device for a turbomachine comprising:
    a planetary carrier and at least one planetary wheel arranged thereon in a rotatable manner, wherein the at least one planetary wheel is arranged in an axial direction between two planetary carrier areas,
    respectively one support appliance being connected with the two planetary carrier areas in a torque-proof manner,
    the at least one planetary wheel being mounted on the support appliance in a rotatable manner,
    a tensioning appliance including cone surfaces and a coupling element,
    wherein, at outer sides of the planetary carrier areas that are facing away from the at least one planetary wheel, the planetary carrier areas are respectively embodied with a cone surface that encloses a connection area with the support appliance, diameters of the cone surfaces decreasing as an axial distance from the at least one planetary wheel increases and respectively acting together with the cone surfaces of the tensioning appliance adjusted to the cone surfaces of the planetary carrier areas and radially enclosing the cone surfaces of the planetary carrier areas, in such a manner that a force, which results from an axial tensioning force of the tensioning appliance that is respectively applied to the cone surfaces of the planetary carrier areas via the coupling element of the tensioning appliance and presses the connection areas inwards in a radial direction, acts at the connection areas between the support appliance and the planetary carrier areas, wherein the cone surfaces of the tensioning appliance are operatively connected to each other via the coupling element.

2. The planetary gear device according to claim 1, wherein the cone surfaces of the planetary carrier areas and the cone surfaces of the tensioning appliance respectively enclose an angle of between 0.5° to 30° with a rotational axis of the planetary carrier.

3. The planetary gear device according to claim 1, wherein the tensioning appliance is embodied with a disc element and a tensioning element, wherein the tensioning element is threaded onto the coupling element for creating the axial tensioning force that acts in the axial direction of the tensioning appliance, and wherein the disc element is embodied with one of the cone surfaces of the tensioning appliance and, in the mounted state of the tensioning appliance, is arranged on the outer side of the planetary carrier area that is facing away from the at least one planetary wheel between the tensioning element and the planetary carrier area.

4. The planetary gear device according to claim 3, wherein the disc element and the tensioning element are formed in one piece.

5. The planetary gear device according to claim 3, wherein the disc element and the tensioning element are embodied as separate structural components.

6. The planetary gear device according to claim 1, wherein the coupling element is formed in one piece with the tensioning element of the tensioning appliance, wherein one of the cone surfaces of the tensioning appliance is provided in an area of the tensioning element and the tensioning element is arranged on the outer side of the planetary carrier area that is facing away from the at least one planetary wheel, with the cone surface of the planetary carrier area and the cone surface of the tensioning element in operative connection.

7. The planetary gear device according to claim 1, wherein the support appliance respectively has end stop surfaces, with which the support appliance acts together with the planetary carrier areas in an area of sides of the planetary carrier areas that face towards the at least one planetary wheel and through which a distance in the axial direction between the planetary carrier areas is defined.

8. The planetary gear device according to claim 1, wherein the tensioning appliance has at least one hydraulic fluid supply channel through which hydraulic fluid can be conducted in a direction of a bearing appliance of the at least one planetary wheel on the support appliance.

9. The planetary gear device according to claim 8, wherein the support appliance is embodied with at least one recess that substantially extends in the radial direction of the at least one planetary wheel and by which hydraulic fluid is supplied to the bearing appliance.

10. A jet engine with the planetary gear device according to claim 1.

* * * * *